United States Patent
Shin et al.

(10) Patent No.: US 9,459,483 B2
(45) Date of Patent: Oct. 4, 2016

(54) LIQUID CRYSTAL DISPLAY

(71) Applicant: Samsung Display Co., Ltd., Yongin (KR)

(72) Inventors: Ju-Hyun Shin, Hwaseong-si (KR); In-Su Baek, Seoul (KR); Dong Choul Yang, Yongin-si (KR); Sang Hwan Lee, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 110 days.

(21) Appl. No.: 14/333,067

(22) Filed: Jul. 16, 2014

(65) Prior Publication Data
US 2015/0160494 A1    Jun. 11, 2015

(30) Foreign Application Priority Data

Dec. 6, 2013 (KR) ........................ 10-2013-0151094

(51) Int. Cl.
*G09G 3/36* (2006.01)
*G02F 1/1333* (2006.01)
*G06F 3/041* (2006.01)
*G02F 1/1335* (2006.01)
*F21V 8/00* (2006.01)
*G06F 3/042* (2006.01)

(52) U.S. Cl.
CPC ......... *G02F 1/13338* (2013.01); *G02B 6/0011* (2013.01); *G02F 1/133308* (2013.01); *G02F 1/133606* (2013.01); *G06F 3/042* (2013.01); *G06F 3/0412* (2013.01); *G02F 2001/13332* (2013.01); *G02F 2001/133314* (2013.01); *G02F 2001/133317* (2013.01)

(58) Field of Classification Search
CPC ............ G02F 1/133308; G02F 2001/133314; G02F 2202/28; G02F 1/133608; G02F 2201/46; G02F 1/13338; G02F 2001/133317; G02F 2001/133331; G02F 2201/50; G06F 1/1637; G06F 3/041; G06F 1/1601; G06F 1/1616; G06F 1/263; G06F 1/32; G06F 1/1643; G06F 1/1656; G06F 1/1658; G06F 1/1679; G06F 1/1681; G06F 1/1683; G06F 1/187; G06F 1/203
USPC .................................................. 345/102, 905
See application file for complete search history.

(56) References Cited

U.S. PATENT DOCUMENTS

| | | | |
|---|---|---|---|
| 7,224,416 B2 * | 5/2007 | Cha ..................... | G02B 6/0088 349/58 |
| 7,237,937 B2 | 7/2007 | Kawashima et al. | |

(Continued)

FOREIGN PATENT DOCUMENTS

| KR | 10-2009-0130776 | 12/2009 |
|---|---|---|
| KR | 10-2012-0075044 | 7/2012 |
| KR | 10-2013-0022259 | 3/2013 |

*Primary Examiner* — Duc Dinh
(74) *Attorney, Agent, or Firm* — H.C. Park & Associates, PLC

(57) ABSTRACT

A display device includes a touch panel, a display panel, a backlight assembly, a bottom chassis, and a rear cover. The display panel is coupled to the touch panel. The backlight assembly includes a light source to supply light to the display panel, and an optical sheet including a protrusion. The display panel is disposed between the touch panel and the backlight assembly. The bottom chassis includes extensions protruding from walls defining a cavity region to receive the display panel. The extensions support the touch panel. The rear cover is configured to receive the bottom chassis. The bottom chassis is disposed between the rear cover and the touch panel. One of the walls of the bottom chassis includes an opening. The protrusion is configured to engage the opening to couple the optical sheet to the bottom chassis.

20 Claims, 12 Drawing Sheets

(56) References Cited

U.S. PATENT DOCUMENTS

2003/0043310 A1* 3/2003 Cho .................... G02B 6/0086
                                                    349/58
2005/0243238 A1* 11/2005 Cha .................... G02B 6/0088
                                                    349/58
2012/0176325 A1    7/2012 Okazaki et al.
2012/0300153 A1   11/2012 Fujii et al.
2013/0127743 A1*  5/2013 Chen .................... G06F 3/041
                                                    345/173

* cited by examiner

LIQUID CRYSTAL DISPLAY

CROSS-REFERENCE TO RELATED APPLICATION

This application claims priority from and the benefit of Korean Patent Application No. 10-2013-0151094, filed on Dec. 6, 2013, which is incorporated by reference for all purposes as if set forth herein.

BACKGROUND

1. Field

Exemplary embodiments relate to display technology, and, more specifically, to liquid crystal displays.

2. Discussion

Display devices (such as liquid crystal displays and organic light emitting displays), portable transmission devices, and other information processing devices may perform functions using various input devices, e.g., an input device including a touch panel. A touch panel may be a device on which text, figures, shapes, symbols, etc., are written (or otherwise drawn) by contacting a finger, touch pen, stylus, etc., on a screen of the touch panel. In this manner, a touch panel may also be configured to perform a desired command via a machine, such as a computer, based on an interaction with one or more displayed icons. The display device, which the touch panel may be coupled, may detect whether a finger of a user, a touch pen, or the like, makes contact with the aforementioned screen. To this end, the display device may be configured to determine contact position information associated with the contact.

The display panel may be fixed (or otherwise coupled) to a mold frame in a bottom chassis. In this manner, the touch panel may be positioned on the display panel, such that the size of the touch panel may be larger than the size of the display panel. Since the touch panel may be exposed to the outside of the display panel, an additional support structure to support the exposed portion of touch panel may be required. This may make it difficult to reduce a bezel area of the display device.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments seek to provide a liquid crystal display configured to reduce a bezel area of a corresponding display device.

Additional aspects will be set forth in the detailed description which follows, and, in part, will be apparent from the disclosure, or may be learned by practice of the inventive concept.

According to exemplary embodiments, a display device includes a touch panel, a display panel, a backlight assembly, a bottom chassis, and a rear cover. The display panel is coupled to the touch panel. The backlight assembly includes a light source to supply light to the display panel, and an optical sheet including a protrusion. The display panel is disposed between the touch panel and the backlight assembly. The bottom chassis includes extensions protruding from walls defining a cavity region configured to receive the display panel. The extensions are configured to support the touch panel. The rear cover is configured to receive the bottom chassis. The bottom chassis is disposed between the rear cover and the touch panel. One of the walls of the bottom chassis includes an opening. The protrusion is configured to engage the opening to couple the optical sheet to the bottom chassis.

According to exemplary embodiments, a display device includes a cover window, a display panel, a backlight assembly, a bottom chassis, and a rear cover. The display panel is coupled to the cover window. The backlight assembly includes a light source to supply light to the display panel, and an optical sheet including a protrusion. The display panel is disposed between the cover window and the backlight assembly. The bottom chassis includes extensions protruding from walls defining a cavity region configured to receive the display panel. The extensions are configured to support the cover window. The rear cover is configured to receive the bottom chassis. The bottom chassis is disposed between the rear cover and the cover window. One of the walls of the bottom chassis includes an opening. The protrusion is configured to engage the opening to couple the optical sheet to the bottom chassis.

According to exemplary embodiments, it may be possible to reduce (e.g., significantly reduce) a bezel area in a liquid crystal display. For instance, a touch panel may be coupled to a display panel using a structure of a bottom chassis, e.g., an extension and an opening, which may enable a mold frame conventionally utilized to couple a touch panel to a display panel to be omitted. As previously mentioned, this may enable the bezel area of the liquid crystal display device to be reduced.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
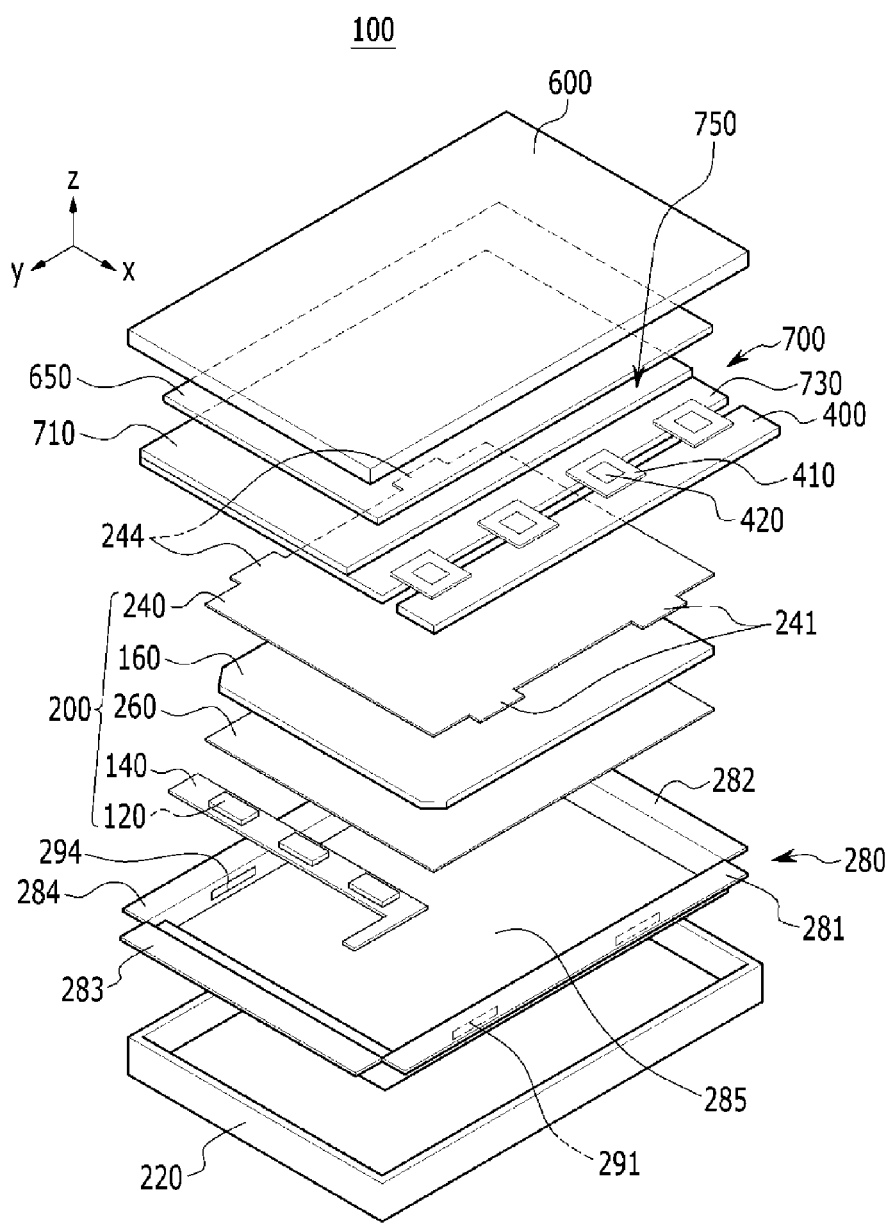
FIG. 1 is an exploded perspective view of a liquid crystal display, according to exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Although various exemplary embodiments are described with respect to liquid crystal display devices, it is contemplated that various exemplary embodiments are also applicable to other types of display devices, such as, for example, other non-self-emissive display devices.

Figure 2:
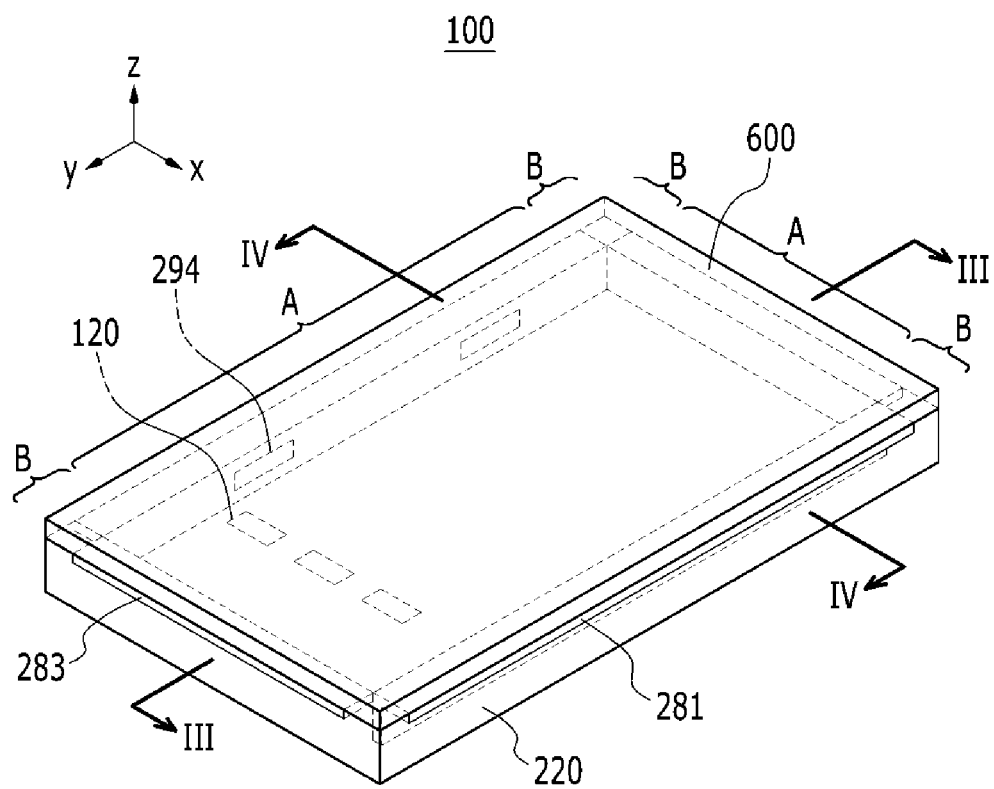
FIG. 2 is a perspective view of the liquid crystal display of FIG. 1, according to exemplary embodiments.

FIG. 1 is an exploded perspective view of a liquid crystal display, according to exemplary embodiments. FIG. 2 is a perspective view of the liquid crystal display of FIG. 1.

Referring to FIGS. 1 and 2, a liquid crystal display 100 may include a backlight assembly 200 to supply light and a liquid crystal panel assembly 700 to receive the light to display an image. Further, the liquid crystal display 100 may include a bottom chassis 280 to couple and support the backlight assembly 200 to the liquid crystal panel assembly 700, as well as may include a rear cover 220. Moreover, the liquid crystal display 100 may include a touch panel 600 on which a text, figure, shape, symbol, etc., may be written (or otherwise drawn) by contacting a finger, touch pen, stylus, or the like, on a screen of the touch panel 600 or a desired command may be executed via interaction with one or more displayed icons. Although specific reference will be made to this particular implementation, it is also contemplated that the liquid crystal display 100 may embody many forms and include multiple and/or alternative components.

According to exemplary embodiments, a panel adhesive layer 650 may be disposed between the touch panel 600 and a liquid crystal panel 750 of the liquid crystal panel assembly 700, to adhesively couple the touch panel 600 and the liquid crystal panel assembly 700 to each other. Further, although not shown, the liquid crystal display 100 may include a protection window to protect the display panel 600 from external impacts, debris, moisture, etc., of an ambient environment.

The liquid crystal panel assembly 700 may include a liquid crystal panel 750 to display an image, a plurality of integrated chip (IC) chip-on-films (COF) 410 connected to liquid crystal panel 750 to supply a driving signal, and a printed circuit board 400. The liquid crystal panel 750 may include a thin film transistor array panel 730 including a plurality of thin film transistors (not shown), a color filter display panel 710 positioned on the thin film transistor array panel 730, and a liquid crystal layer (not illustrated) disposed between the display panels 730 and 710. The thin film transistor array panel 730 and the color filter display panel 710 may also be referred to herein as a first display panel and a second display panel, respectively. It is noted that polarizers (not illustrated) may be attached to an upper side of the color filter display panel 710 and a lower side of the thin film transistor array panel 730 to polarize light passing through the liquid crystal panel 750.

In exemplary embodiments, the thin film transistor array panel 730 may include a transparent glass substrate on which a plurality of thin film transistors may be formed in any suitable formation, such as, for example, a matrix formation. Data lines may be connected to respective source terminals of the thin film transistors, whereas gate lines may be connected to corresponding gate terminals of the thin film transistors. To this end, pixel electrodes made of any suitable material, e.g., a transparent conductive material, e.g., aluminum zinc oxide (AZO), gallium zinc oxide (GZO), indium tin oxide (ITO), indium zinc oxide (IZO), etc., may be connected to respective drain terminals of the thin film transistors. It is also contemplated that one or more conductive polymers (ICP) may be utilized for the pixel electrodes. For example, polyaniline (PANI), poly(3,4-ethylenedioxythiophene) poly(styrenesulfonate) (PEDOT:PSS), etc., may be utilized in association with exemplary embodiments described herein.

The color filter display panel 710 may be disposed on the thin film transistor array panel 730, and, thereby, may face the thin film transistor array panel 730. The color filter display panel 710 may be a substrate on which one or more color filters may be formed to express determined color(s) while light passes through the color filter(s). The color filters may be formed by a thin film formation process. A common electrode (not shown), which may be formed of any suitable material, e.g., one or more of the aforementioned conductive transparent materials, e.g., AZO, GZO, ITO, IZO, PANI, PEDOT:PSS, etc., may be coated on the entire (or substantially entire) surface of the color filter display panel 710.

According to exemplary embodiments, an electric signal may be input to the data lines and the gate lines of the liquid crystal panel 750 via the printed circuit board 400. To this end, an electric signal may be input to the source terminals and the gate terminals of the thin film transistors, such that the thin film transistors may be turned on or off, and, as such, an electric signal to form an image via a pixel of the liquid crystal panel 750 may be output to the drain terminals. When power is applied to a gate terminal and a source terminal of the thin film transistor to turn on the thin film transistor, an electric field may be generated between the pixel electrode and the common electrode of the color filter display panel 710. An alignment angle of liquid crystal injected between the thin film transistor array panel 730 and the color filter display panel 710 may be changed by the electric field, such that light transmittance through the liquid crystal layer may be changed according to the changed alignment angle. This may enable the liquid crystal panel 750 to display an image.

As seen in FIG. 1, the printed circuit board 400 may be connected to a plurality of IC chip on films 410 attached to the liquid crystal panel 750. The IC chip on films 410 may be spaced apart from each other by determined distances. To this end, the printed circuit board 400 may generate a data signal, which is a signal for driving the liquid crystal display 100, a gate driving signal, and a plurality of timing signals to apply the various signals at a determined timing. Further, the printed circuit board 410 may apply the gate driving signal and the data driving signal to the gate lines and the data lines of the liquid crystal panel 750 through the IC chip on films 410, on which corresponding IC chips 420 are respectively mounted.

As previously mentioned, the backlight assembly 200 may be configured to supply light (e.g., uniform light) to the liquid crystal panel 750. The backlight assembly 200 may be disposed below the liquid crystal panel 750. That is, the liquid crystal panel 750 may be disposed between the touch panel 600 and the backlight assembly 200. The backlight assembly 200 may be fixed (or otherwise coupled) to the bottom chassis 280 and may include one or more light sources 120 to supply the light to the liquid crystal panel 750. A light source power substrate 140 may supply power to the light sources 120. The light sources 120 may be light emitting diodes; however, it is contemplated that any other suitable light source may be utilized in association with exemplary embodiments described herein.

In exemplary embodiments, the backlight assembly 200 may also include a light guide plate 160 to guide light emitted from the light sources 120 toward the liquid crystal panel 750, a reflective sheet 260 disposed below the light guide plate 160 to reflect light, and an optical sheet 240 disposed on the light guide plate 160 to control luminance characteristics of the light from the light sources 120 to supply the light to the liquid crystal panel 750. Although the optical sheet 240 is shown as a single optical sheet in FIG. 1, it is contemplated that the optical sheet 240 may be configured of a plurality of optical sheets. A plurality of first protrusions 241 and fourth protrusions 244 of the optical sheet 240 may be coupled to the bottom chassis 280, which is described in more detail below. It is noted, however, that the first protrusions 241 and the fourth protrusions 244 may be formed at opposite sides of the optical sheet 240 which face each other.

As seen in FIG. 1, the first protrusions 241 and the fourth protrusions 244 of the optical sheet 240 each include two protrusions, respectively. It is contemplated, however, that any suitable number of protrusions may be utilized. To this end, the number of first protrusions 241 and fourth protrusions 244 may correspond to the number of first openings 291 and fourth openings 294 respectively formed in the bottom chassis 280. Further, the first protrusions 241 and the fourth protrusions 244 may be inserted in, and, thereby, fixed in the first openings 241 and the fourth openings 294 formed in the side of the bottom chassis 280.

According to exemplary embodiments, the bottom chassis 280 includes a body 285 seating and supporting the backlight assembly 200, a first extension 281, a second extension 282, a third extension 283, and a fourth extension 284. The first to fourth extensions 281 to 284 may extend in four directions from the body 285. The first extension 281 and the fourth extension 284 face one another, and the second extension 282 and the third extension 283 face each other. To this end, the first to fourth extensions 281 to 284 may be formed in respective directions from corresponding wall surfaces of the body 285, which may be formed at each lateral side of the bottom chassis 280. In this manner, each of the first to fourth extensions 281 to 284 may extend away from a central portion of the bottom chassis 280.

As seen in FIG. 1, a plurality of first openings 291 and fourth openings 294 may be formed in respective sides of the body 285. It is noted that the first openings 291 and fourth openings 294 may be positioned in correspondence with the first extensions 281 and the fourth extensions 284 of the optical sheet 240, respectively. The first protrusions 241 and the fourth protrusions 244 may be fixed in the plurality of first openings 291 and fourth openings 294, respectively. In this manner, the backlight assembly 200 may be coupled to the bottom chassis 280. A rear cover 220 may be coupled to and receive the bottom chassis 280. In this manner, the rear cover 220 may be disposed below the bottom chassis 280.

According to exemplary embodiments, the touch panel 600 may be disposed on the liquid crystal panel 750. To this end, it is noted that the size of the touch panel 600 may be greater than the size of the liquid crystal panel 750. The touch panel 600 may be coupled to the upper surface of the liquid crystal panel 750 via the panel adhesive layer 650. A coupled (or otherwise assembled) state of the liquid crystal display 100 will be described in more detail with reference to FIGS. 3 and 4.

Figure 3:
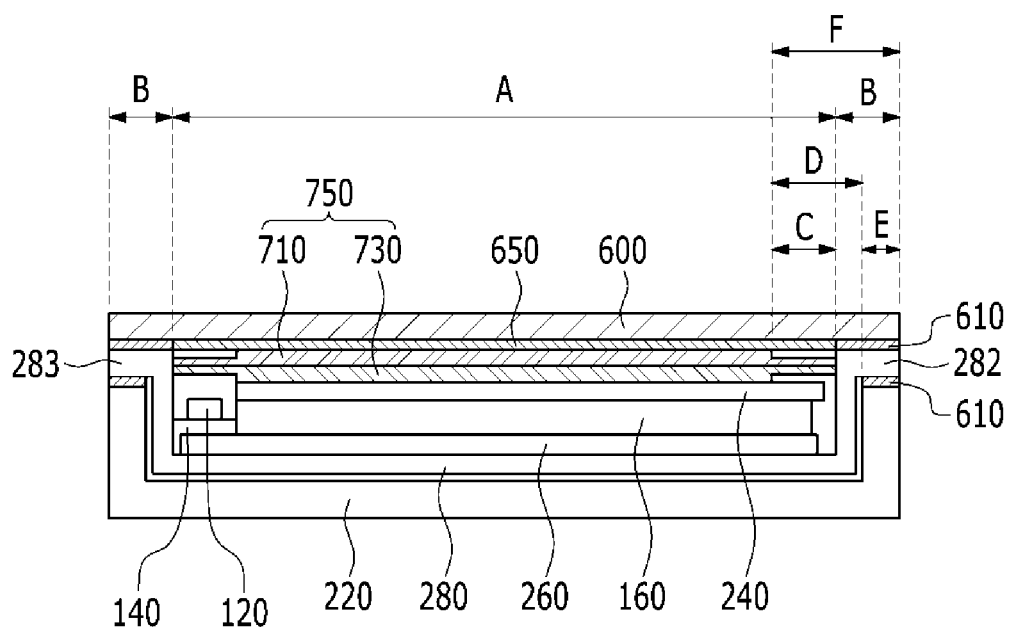
FIG. 3 is a cross-sectional view of the liquid crystal display of FIG. 2 taken along sectional line III-III, according to exemplary embodiments.

FIG. 3 is a cross-sectional view of the liquid crystal display of FIG. 2 taken along sectional line III-III, according to exemplary embodiments. It is noted that the cross-sectional view of FIG. 3 illustrates a portion of the liquid crystal display 100 that does not include the first protrusions 241 and the fourth protrusions 244 of the optical sheet 240.

As seen FIG. 3, the touch panel 600 is attached (or otherwise coupled) to the upper surface of the liquid crystal panel 750 via the panel adhesive layer 650. The size of the touch panel 600 is greater than the size of the liquid crystal panel 750. In this manner, the touch panel 600 includes a panel area A corresponding to the liquid crystal panel 750, and a peripheral area B corresponding to a periphery of the panel area A. It is noted that the touch panel 600 may be of any suitable type, such as, for example, a resistive type, a capacitive type, an electromagnetic type, and/or the like. The peripheral area B of the touch panel 600 may be disposed on the first extension 281, the second extension 282, the third extension 283, and the fourth extension 284. The first extension to the fourth extension 281 to 284 may be coupled to the peripheral area B of the touch panel 600 via an adhesive member 610. For instance, the adhesive member 610 may be a double-sided adhesive tape; however, it is contemplated that any suitable adhesive or coupling mechanism may be utilized in association with exemplary embodiments described herein. As such, the first extension to the fourth extension 281 to 284 of the bottom chassis 280 may function as a supporter to support the touch panel 600.

According to exemplary embodiments, the liquid crystal panel 750 may be coupled to the lower surface of the touch panel 600, which may be adhesively coupled to the bottom chassis 280 using the panel adhesive layer 650 instead of a conventional method of coupling the liquid crystal panel 750 to a mold frame in a traditional liquid crystal display.

Figure 4:
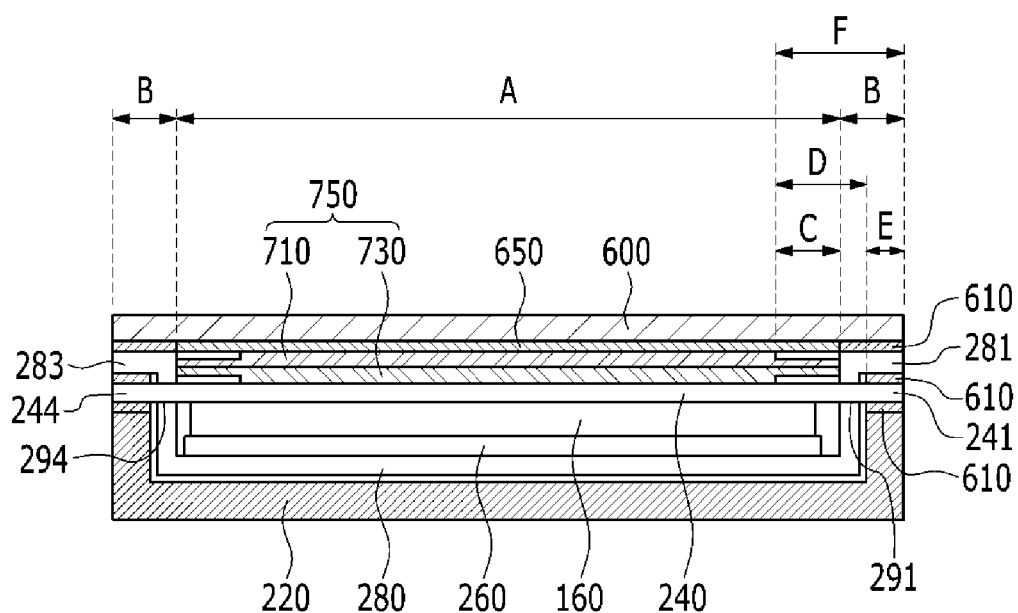
FIG. 4 is a cross-sectional view of the liquid crystal display of FIG. 2 taken along sectional line IV-IV, according to exemplary embodiments.

FIG. 4 is a cross-sectional view of the liquid crystal display of FIG. 2 taken along sectional line IV-IV, according to exemplary embodiments. It is noted that the cross-sectional view of FIG. 4 illustrates a portion of the liquid crystal display 100 including the first protrusions 241 and the fourth protrusions 244 respectively inserted in the first openings 291 and the fourth openings 294. It is also noted that the configuration of FIG. 4 is substantially similar to the configuration of FIG. 3, except for the presence of the first openings 291 and the fourth openings 294 of the bottom chassis 280 and the first protrusions 241 and the fourth protrusions 244 of the optical sheet 240. As such, duplicative descriptions have been omitted to avoid obscuring exemplary embodiments described herein.

As illustrated in FIG. 4, the first openings 291 and the fourth openings 294 may be formed in respective sides of the body 285 below the first extension 281 and the fourth extension 284 of the bottom chassis 280. The first protrusions 241 and the fourth protrusions 244 of the optical sheet 240 are inserted in the first openings 291 and the fourth openings 294, respectively. In this manner, the optical sheet 240, the light guide plate 160, and the reflective sheet 260 may be coupled to the bottom chassis 280.

According to exemplary embodiments, the first protrusions 241 and the fourth protrusions 244 of the optical sheet 240 protrude from the optical sheet 240, and, thereby, are respectively disposed below the first extension 281 and the fourth extension 284 of the bottom chassis 280. To this end, respective portions of the lower surfaces of the first protrusions 241 and the fourth protrusions 244 of the optical sheet 240 may be adhesively coupled to corresponding portions of the upper surfaces of the side walls of the rear cover 220 via adhesive member 610. Further, respective portions of the upper surfaces of the first protrusions 241 and the fourth protrusions 244 may be adhesively coupled to corresponding portions of the lower surfaces of the first extension 281 and the fourth extension 284 of the bottom chassis 280 via an adhesive member 610. In addition, the peripheral area B of the touch panel 600 may be coupled to corresponding portions of the upper surfaces of the first extension 281 and the fourth extension 284 of the bottom chassis 280 via adhesive member 610. As previously mentioned in association with FIG. 3, the peripheral area B of the touch panel 600 may also be coupled to corresponding portions of the upper surfaces of the second extension 282 and the third extension 283 of the bottom chassis 280 via adhesive member 610.

As seen in FIGS. 3 and 4, an upper surface of the display panel 750 may be adhesively coupled to the lower surface of the touch panel 600, which, as previously described, may be adhesively coupled to corresponding upper surfaces of the first extension 281, second extension 282, third extension 283, and fourth extension 284 of the bottom chassis 280. It is contemplated that the adhesive member 610 may be a double-sided adhesive tape; however, any other suitable coupling mechanism may be utilized in association with exemplary embodiments described herein.

According to exemplary embodiments, a bezel area F of the liquid crystal display 100 may include a bezel area D of the liquid crystal panel 750 (including a black matrix region C of the liquid crystal panel 750) and a bezel area E of the rear cover 220. A conventional liquid crystal display including a mold frame may include a portion where the mold frame is disposed, which may increase the size of an associated backlight assembly bezel area. In this manner, the bezel area of a conventional liquid crystal display may include three bezel areas, e.g., the bezel area of the backlight assembly, the bezel area of the rear cover, and a bezel area associated with the liquid crystal panel. In exemplary embodiments, however, since the bezel area E of the backlight assembly and the bezel area E of the rear cover overlap one another, the entire bezel area F may be significantly reduced as compared with the entire bezel area of a conventional liquid crystal display.

An illustrative coupling between the optical sheet 240 and the bottom chassis 280 will be described in more detail with reference to FIGS. 5, 6, 7A, and 7B.

Figure 5:
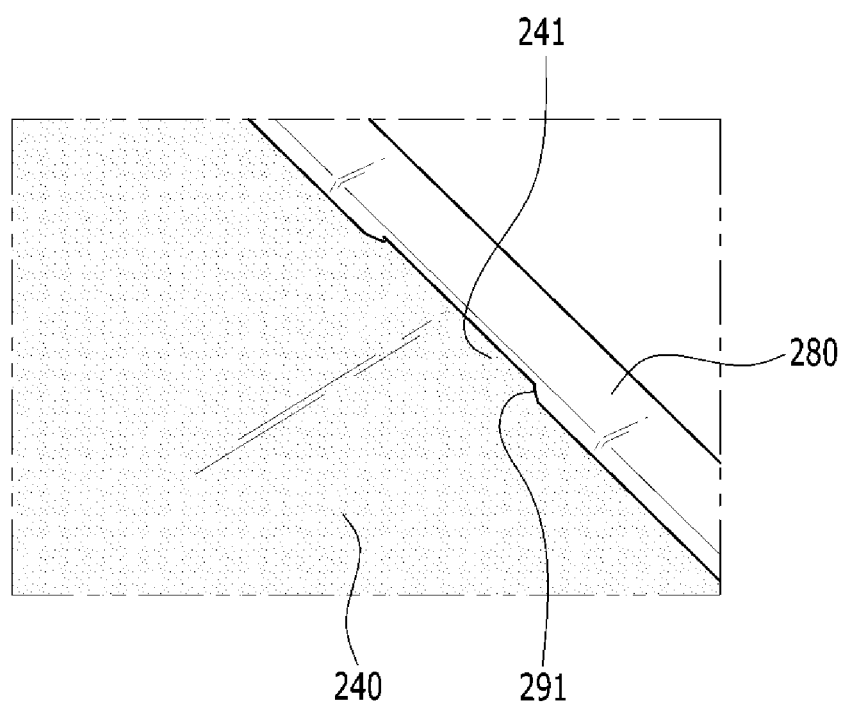
FIG. 5 is an enlarged plan view of a protrusion of an optical sheet of the liquid crystal display of FIG. 4, according to exemplary embodiments.
Figure 6:
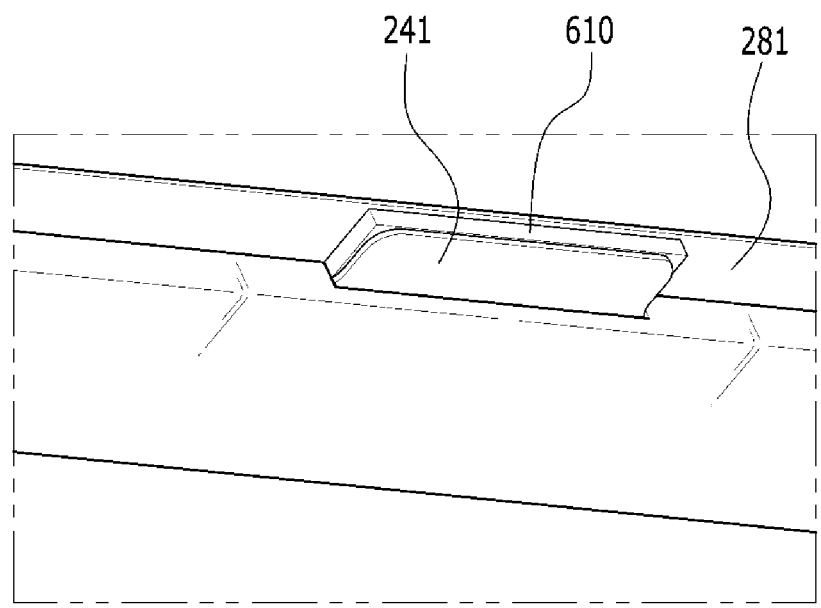
FIG. 6 is an enlarged rear view of a protrusion of an optical sheet of the liquid crystal display of FIG. 4, according to exemplary embodiments.
Figure 7A:
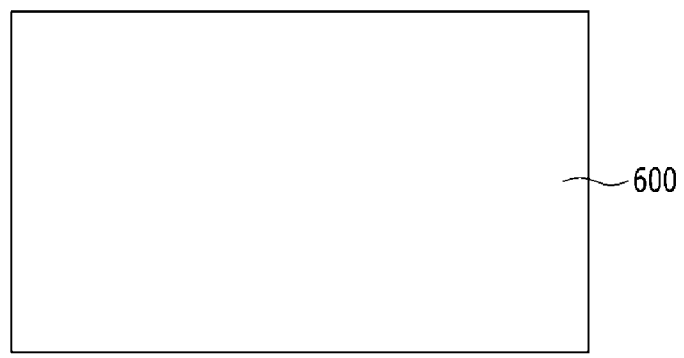
FIG. 7A is a plan view of a backlight assembly and a touch panel of a liquid crystal display, according to exemplary embodiments.
Figure 7B:
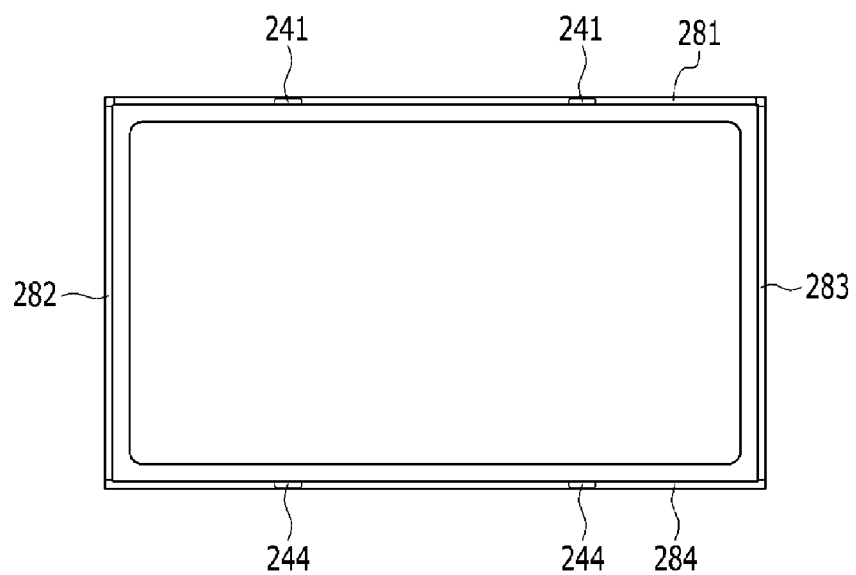
FIG. 7B is a rear view of a backlight assembly and a touch panel of a liquid crystal display, according to exemplary embodiments.

FIG. 5 is an enlarged plan view of a protrusion of an optical sheet of the liquid crystal display of FIG. 4, according to exemplary embodiments. FIG. 6 is an enlarged rear view of a protrusion of an optical sheet of the liquid crystal display of FIG. 4, according to exemplary embodiments. FIG. 7A is a plan view of a backlight assembly and a touch panel of a liquid crystal display, according to exemplary embodiments. FIG. 7B is a rear view of a backlight assembly and a touch panel of a liquid crystal display, according to exemplary embodiments.

Referring to FIGS. 5 and 6, the first protrusion 241 of the optical sheet 240 may be inserted into the first opening 291 of the bottom chassis 280. To this end, the first protrusion 241 of the optical sheet 240 may be adhesively coupled to the lower surface of the first extension 281 of the bottom chassis 280 via adhesive member 610. The adhesive member 610 may fill the remaining space from the lower surface of the first protrusion 241 to the lower surface of the first extension 281.

As seen in FIG. 7A, the entire upper surface of the touch panel 600 may be viewed even though the touch panel 600 is coupled to the bottom chassis 280. Referring to FIG. 7B, the first protrusions 241 and the fourth protrusions 244 of the optical sheet 240 may be inserted into and protrude through the first openings 291 and the fourth openings 294 of the bottom chassis 280, respectively. In this manner, the optical sheet 240, and, thereby, the liquid crystal panel 750 may be coupled to the bottom chassis 280 via, for instance, one or more of the first to fourth extensions 281 to 284.

Figure 8:
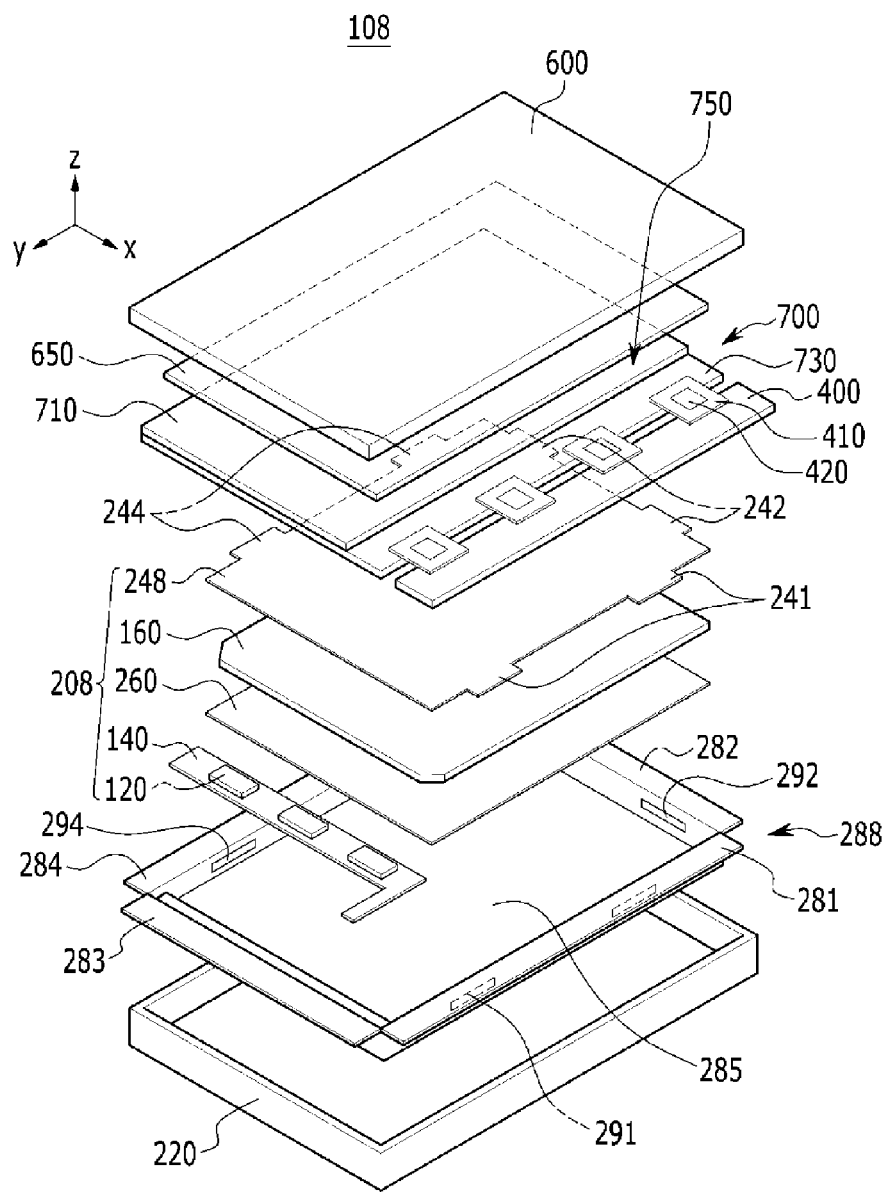
FIG. 8 is an exploded perspective view of a liquid crystal display, according to exemplary embodiments.
Figure 9:
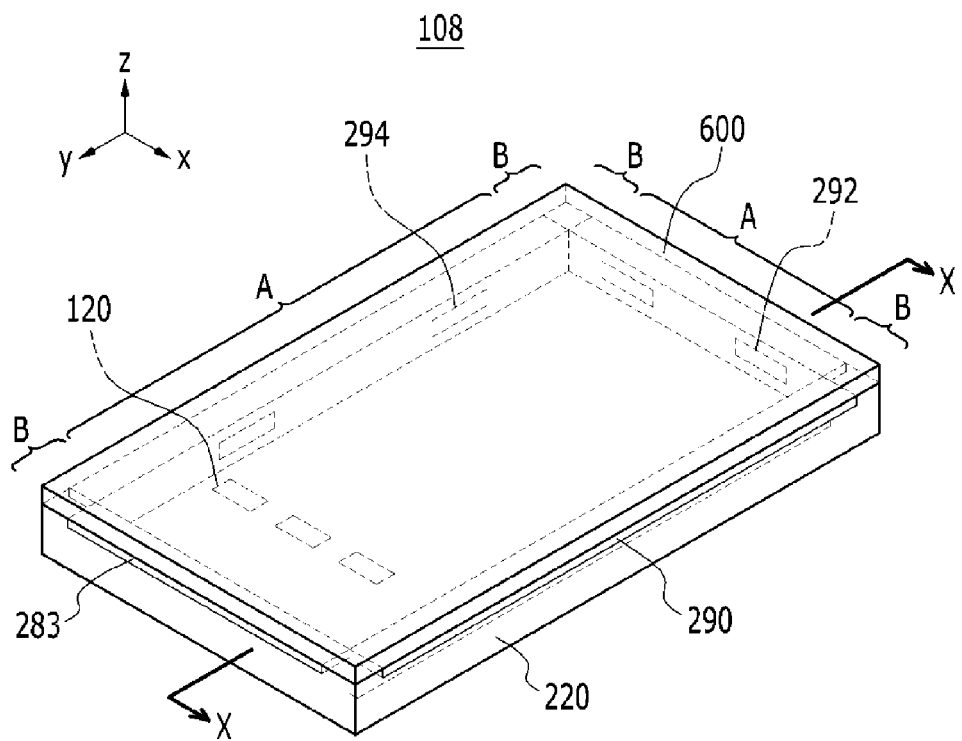
FIG. 9 is a perspective view of the liquid crystal display of FIG. 8, according to exemplary embodiments.

FIG. 8 is an exploded perspective view of a liquid crystal display, according to exemplary embodiments. FIG. 9 is a perspective view of the liquid crystal display of FIG. 8. It is noted that the liquid crystal display 108 of FIGS. 8 and 9 is substantially similar to the liquid crystal display 100 of FIGS. 1 and 2, except for the configuration of the optical sheet 248 of the backlight assembly 208 and the bottom chassis 288. Duplicative descriptions, therefore, will be avoided to prevent obfuscation of exemplary embodiments described herein.

As illustrated in FIGS. 8 and 9, the bottom chassis 288 of the liquid crystal display 108 may further include second openings 292. To this end, the optical sheet 248 may also include second protrusions 242. As such, the bottom chassis 288 of the liquid crystal display 108 may include first, second, and fourth openings 291, 292, and 294 formed in three corresponding side walls of the bottom chassis 288. The optical sheet 240 may include first protrusions 241, second protrusions 242, and fourth protrusions 244 respectively corresponding to the first, second, and fourth openings 291, 292, and 294. In this manner, the first, second, and fourth protrusions 241, 242, and 244 may be respectively inserted into the first, second, and fourth openings 291, 292, and 294 of the bottom chassis 288 to couple the backlight assembly 208 to the bottom chassis 288.

Figure 10:
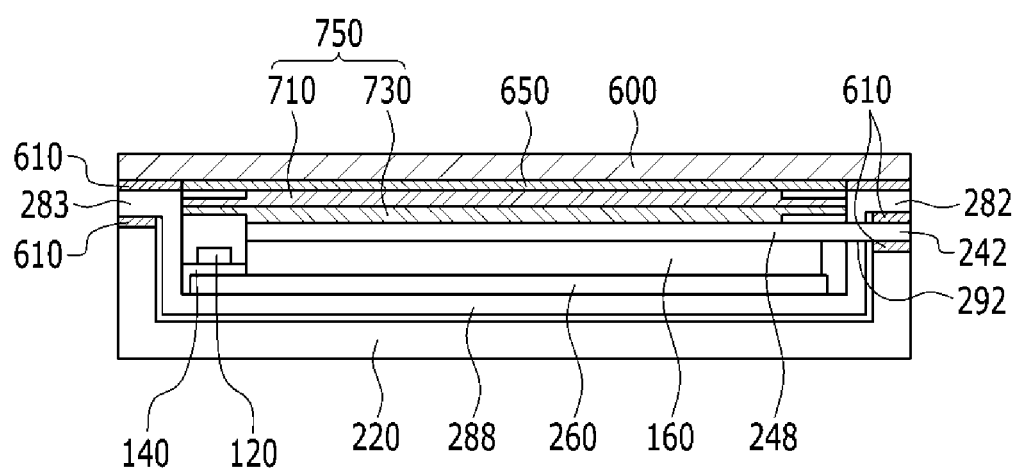
FIG. 10 is a cross-sectional view of the liquid crystal display of FIG. 9 taken along sectional line X-X, according to exemplary embodiments.

FIG. 10 is a cross-sectional view of the liquid crystal display of FIG. 9 taken along sectional line X-X, according to exemplary embodiments.

As seen in FIG. 10, the liquid crystal display 108 does not include openings formed in the side wall of the bottom chassis 288 from which the third extension 283 protrudes, and, as such, the light source 120 is not covered by the optical sheet 248. The second openings 292 may be formed in the side wall of the bottom chassis 288 from which the second extension 282 protrudes. As previously mentioned, the second extension 282 protrudes in an opposite direction to the direction in which the third extension 283 protrudes. The second protrusions 242 of the optical sheet 248 may be inserted into the second openings 292 of the bottom chassis 288 to couple the optical sheet 248 to the bottom chassis 288.

The second protrusions 242 of the optical sheet 248 may be disposed below the second extension 282 of the bottom chassis 288. To this end, the lower surfaces of the second protrusions 242 may be adhesively coupled to corresponding upper surfaces of the side wall of the rear cover 220 via the adhesive member 610. The upper surfaces of the second protrusions 242 may be adhesively coupled to the lower surface of the second extension 282 of the bottom chassis 288 via the adhesive member 610.

As seen in FIG. 10, the third extension 283 of the bottom chassis 288 may be adhesively coupled to the upper surface of the side wall of the rear cover 220 via adhesive member 610. It is noted that the optical sheet 248 does not extend between the third extension 283 and the rear cover 220. Further, the peripheral area B of the touch panel 600 may be adhesively coupled to the upper surfaces of the second extension 282 and the third extension 283 of the bottom chassis 288 via the adhesive member 610. It is also noted that the peripheral area B of the touch panel 600 may be adhesively coupled to the upper surfaces of the first and fourth extensions 281 and 284 via the adhesive member 610.

According to exemplary embodiments, the display panel 750 may be adhesively coupled to the lower surface of the touch panel 600, which may be adhesively coupled to the upper surfaces of one or more of the first through fourth extensions 281 to 284 of the bottom chassis 288. It is noted that the adhesive member 610 may be a double-sided adhesive tape; however, it is contemplated that any other suitable coupling mechanism may be utilized in association with exemplary embodiments described herein.

As seen in FIGS. 8-10, the bottom chassis 288 does not include openings formed in the side wall of the bottom chassis 288 from which the third extension 283 protrudes. In this manner, the light source 120 may be disposed near the side wall with the third extension 283, and, as such, a black matrix portion of the liquid crystal panel 750 may become thicker in a region where the light source 120 is disposed. To this end, a protrusion of the optical sheet 248 may not be included on this side of the liquid crystal display 108.

Figure 11:
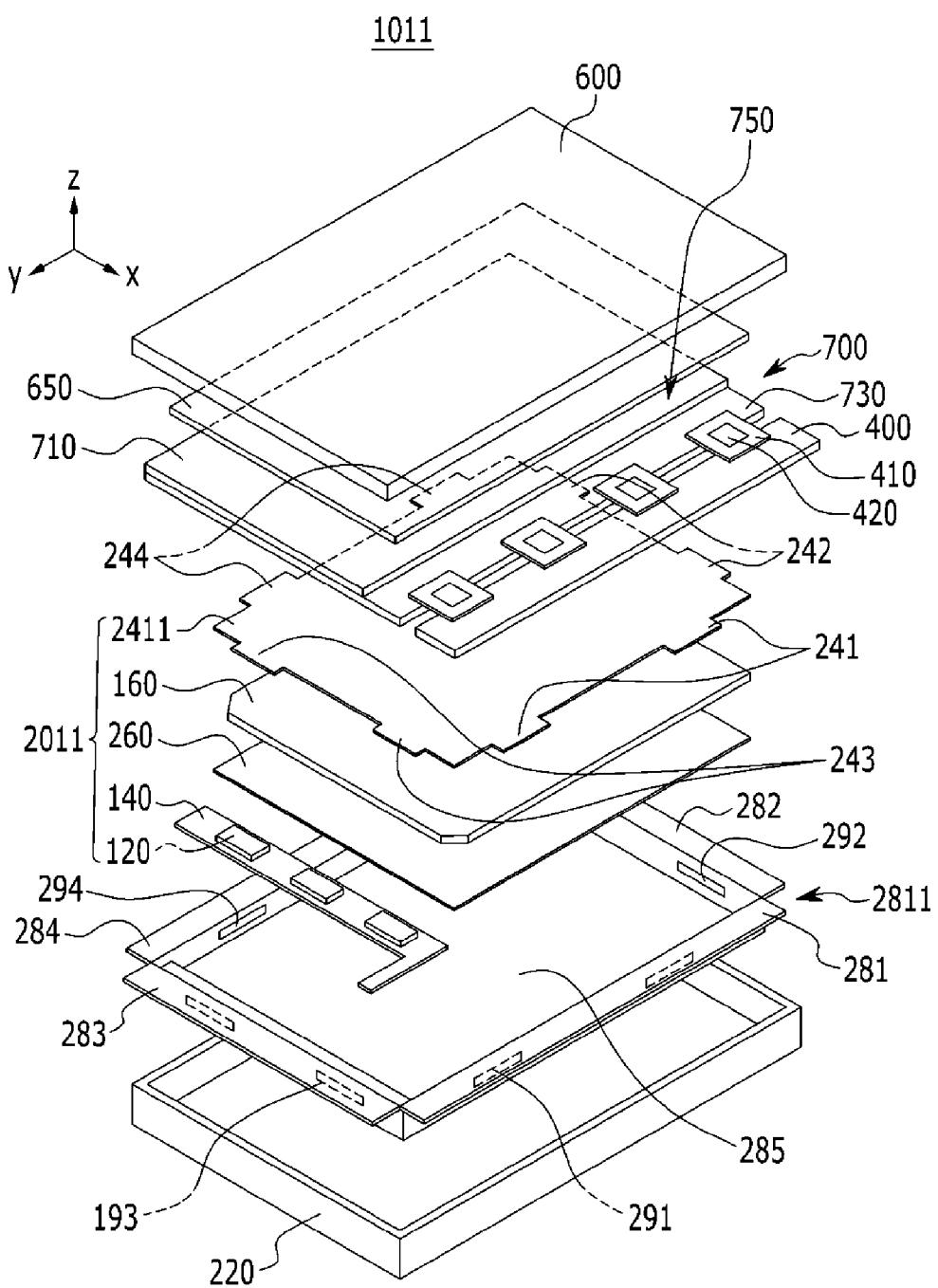
FIG. 11 is an exploded perspective view of a liquid crystal display device, according to exemplary embodiments.

FIG. 11 is an exploded perspective view of a liquid crystal display device, according to exemplary embodiments. It is noted that the liquid crystal display 1011 of FIG. 11 is substantially similar to the liquid crystal display 108 of FIGS. 8-10, except for the configuration of the optical sheet 2411 of the backlight assembly 2011 and the bottom chassis 2811. Duplicative descriptions, therefore, will be avoided to prevent obfuscation of exemplary embodiments described herein.

That is, unlike the liquid crystal display 108 of FIGS. 8 and 9, the liquid crystal display 1011 of FIG. 11 also includes third openings 293 formed in the side wall of the bottom chassis 2811 from which the third extension 283 protrudes. In this manner, the optical sheet 2411 may also include third protrusions 243 corresponding to the third openings 293 of the bottom chassis 2811. In this manner, the first, second, third, and fourth protrusions 241, 242, 243, and 244 of the optical sheet 2411 may be respectively inserted into the first, second, third, and fourth openings 291, 292, 293, and 294 of the bottom chassis 2811 to couple the backlight assembly 2011 to the bottom chassis 2811.

Figure 12:
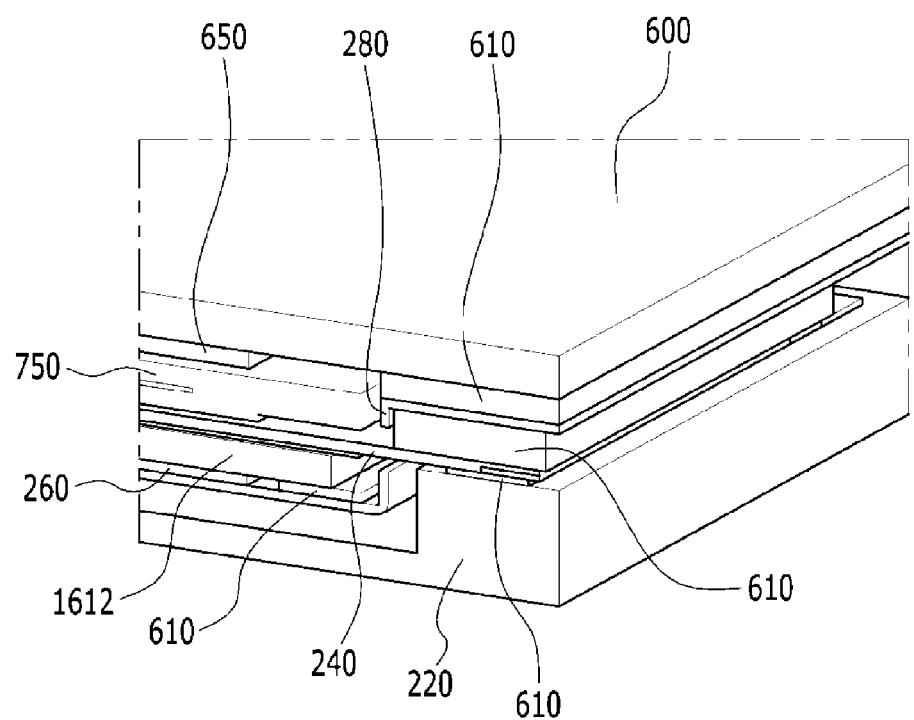
FIG. 12 is a cross-sectional perspective view of a portion of a liquid crystal display device, according to exemplary embodiments.

FIG. 12 is a cross-sectional perspective view of a portion of a liquid crystal display device, according to exemplary embodiments. It is noted that the liquid crystal display 1012 of FIG. 12 is substantially similar to the liquid crystal display 100 of FIGS. 1-4, except that the adhesive member 610 may be disposed below the light guide plate 1612. To this end, a size of the light guide plate 1612 may also be different. Duplicative descriptions, therefore, will be avoided to prevent obfuscation of exemplary embodiments described herein.

Referring to FIG. 12, a size of the light guide plate 1612 may be greater than the size of the reflective sheet 260, whereas in FIGS. 1-4, the light guide plate 1612 may be smaller than the reflective sheet 260. Further, in FIG. 12, the adhesive member 650 may not be formed over a region where the reflective sheet 260 is not formed. An adhesive member 610 may be formed between the light guide plate 1612 and the bottom chassis 280. As such, the reflective sheet 260 may be disposed between the bottom chassis 280 and the light guide plate 1612, with the adhesive member 610 spaced apart from the reflective sheet 260 in a lateral direction. To this end, the adhesive member 610 be formed at (or near) the edge of the light guide plate 1612 to more firmly couple the light guide plate 1612 to the bottom chassis 280.

As previously described in association with FIGS. 1, 2, 8, 9, and 11, the light source 120 was merely formed at one (e.g., a left) side of the corresponding liquid crystal displays. It is contemplated, however, that light sources 120 may be formed in association any one or more of the various sides of the bottom chassis. For instance, the light sources 120 may be formed in association with only the left side, with only the right side, with only the upper side, or with only the lower side, or a combination thereof. In this manner, the openings of the bottom chassis 280 and the protrusions of the optical sheet 240 may be omitted or not included in association with sides of the liquid crystal display including light sources 120.

Further, although the liquid crystal panel 750 has been described as being coupled to the touch panel 600, which is coupled to the bottom chassis 280 and occupying a greater area than the liquid crystal panel 750, it is contemplated that the touch panel 600 may include or be replaced by a cover window coupled to the bottom chassis 280, such that the cover window occupies a greater area than the liquid crystal panel 750.

According to exemplary embodiments, it may be possible to reduce (e.g., significantly reduce) a bezel area in a liquid crystal display. For instance, a touch panel may be coupled to a display panel using a structure of a bottom chassis, e.g., an extension and an opening, which may enable a mold frame conventionally utilized to couple a touch panel to a display panel to be omitted. As previously mentioned, this may enable the bezel area of the liquid crystal display device to be reduced.

Although certain exemplary embodiments and implementations have been described herein, other embodiments and modifications will be apparent from this description.

Accordingly, the inventive concept is not limited to such embodiments, but rather to the broader scope of the presented claims and various obvious modifications and equivalent arrangements.

What is claimed is:

1. A display device, comprising:
a touch panel;
a display panel coupled to the touch panel;
a backlight assembly comprising:
   a light source configured to supply light to the display panel; and
   an optical sheet comprising a protrusion, the display panel being disposed between the touch panel and the backlight assembly;
a bottom chassis comprising extensions protruding from walls defining a cavity region configured to receive the display panel, the extensions protruding away from a central portion the cavity region and being configured to support the touch panel; and
a rear cover configured to receive the bottom chassis, the bottom chassis being disposed between the rear cover and the touch panel,
wherein:
   one of the walls of the bottom chassis comprises an opening; and
   the protrusion is configured to engage the opening to couple the optical sheet to the bottom chassis.

2. The display device of claim 1, wherein:
the touch panel is larger than the display panel; and
the touch panel comprises a panel area covering the display panel and a peripheral area disposed outside the panel area.

3. The display device of claim 2, further comprising:
first adhesive members,
wherein upper surfaces of the extensions of the bottom chassis are adhesively coupled to a lower surface of the peripheral area of the touch panel via the first adhesive members.

4. The display device of claim 3, further comprising:
a second adhesive member,
wherein:
   one of the walls of the bottom chassis does not comprise an opening configured to receive a protrusion of the optical sheet;
   one of the extensions of the bottom chassis protrudes from the one wall not comprising an opening configured to receive a protrusion of the optical sheet; and
   a lower surface of the one extension is adhesively coupled to an upper surface of a side wall of the rear cover via the second adhesive member.

5. The display device of claim 4, wherein:
the opening is one of a plurality of openings in the bottom chassis; and
the protrusion is one of a plurality of protrusions of the optical sheet.

6. The display device of claim 5, wherein:
the openings are disposed in two walls of the bottom chassis; and
the protrusions are configured to respectively engage the openings.

7. The display device of claim 5, further comprising:
third adhesive members,
wherein lower surfaces of the protrusions of the optical sheet are adhesively coupled to upper surfaces of side walls of the rear cover via the third adhesive members.

8. The display device of claim 7, further comprising:
fourth adhesive members,
wherein upper surfaces of the protrusions of the optical sheet are adhesively coupled, via the fourth adhesive members, to lower surfaces of the extensions of the bottom chassis protruding from the walls of the bottom chassis comprising at least one of the openings.

9. The display device of claim 8, wherein:
the extensions comprise a first extension, a second extension, a third extension, and a fourth extension;
the openings are disposed in the first extension and the fourth extension; and
the first extension and the fourth extension oppose one another.

10. The display device of claim 5, wherein:
the light source is disposed relatively closer to one wall of the bottom chassis;
the openings are disposed in three walls of the bottom chassis; and
the protrusions are configured to respectively engage the openings.

11. The display device of claim 10, wherein the one wall disposed relatively closer to the light source does not comprise an opening configured to receive a protrusion of the optical sheet.

12. The display device of claim 10, further comprising:
third adhesive members,
wherein lower surfaces of the protrusions of the optical sheet are adhesively coupled to upper surfaces of side walls of the rear cover via the third adhesive members.

13. The display device of claim 12, further comprising:
fourth adhesive members,
wherein upper surfaces of the protrusions of the optical sheet are adhesively coupled, via the fourth adhesive members, to lower surfaces of the extensions of the bottom chassis protruding from the walls of the bottom chassis comprising at least one of the openings.

14. The display device of claim 3, wherein:
the opening is one of a plurality of openings in the bottom chassis; and
the protrusion is one of a plurality of protrusions of the optical sheet.

15. The display device of claim 14, wherein:
each wall of the bottom chassis comprises at least one of the openings; and
the protrusions are configured to respectively engage the openings.

16. The display device of claim 15, further comprising:
second adhesive members,
wherein lower surfaces of the protrusions of the optical sheet are adhesively coupled to upper surfaces of side walls of the rear cover via the second adhesive members.

17. The display device of claim 16, further comprising:
third adhesive members,
wherein upper surfaces of the plurality of protrusions of the optical sheet are adhesively coupled to lower surfaces of the extensions of the bottom chassis via the third adhesive members.

18. A display device, comprising:
a cover window;
a display panel coupled to the cover window;
a backlight assembly comprising:
    a light source configured to supply light to the display panel; and
    an optical sheet comprising a protrusion, the display panel being disposed
        between the cover window and the backlight assembly;
a bottom chassis comprising extensions protruding from walls defining a cavity region configured to receive the display panel, the extensions protruding away from a central portion of the cavity region and being configured to support the cover window; and
a rear cover configured to receive the bottom chassis, the bottom chassis being disposed between the rear cover and the cover window,
wherein:
    one of the walls of the bottom chassis comprises an opening; and
    the protrusion is configured to engage the opening to couple the optical sheet to the bottom chassis.

19. The display device of claim 18, further comprising:
first adhesive members,
wherein:
the cover window is larger than the display panel;
the cover window comprises a panel area covering the display panel and a
peripheral area disposed outside the panel area; and
upper surfaces of the extensions of the bottom chassis are adhesively coupled to
    a lower surface of the peripheral area of the cover window via the first
    adhesive members.

20. The display device of claim 19, further comprising:
a second adhesive member;
a third adhesive member; and
a fourth adhesive member,
wherein:
    one of the walls of the bottom chassis does not comprise an opening configured to receive a protrusion of the optical sheet;
    one of the extensions of the bottom chassis protrudes from the one wall not comprising an opening configured to receive a protrusion of the optical sheet;
    a lower surface of the one extension is adhesively coupled to an upper surface of a side wall of the rear cover via the second adhesive member;
    a lower surface of the protrusion of the optical sheet is adhesively coupled to an upper surface of another side wall of the rear cover via the third adhesive member; and
    an upper surface of the protrusion of the optical sheet is adhesively coupled, via the fourth adhesive member, to a lower surface of an extension of the bottom chassis disposed over the opening.

* * * * *